(12) United States Patent
Gobin et al.

(10) Patent No.: US 10,611,039 B2
(45) Date of Patent: Apr. 7, 2020

(54) PORTABLE CAMERA DEVICE TO BE ATTACHED TO A REMOTE MANIPULATOR GRIPPER

(71) Applicant: COMMISSARIAT A L'ENERGIE ATOMIQUE ET AUX ENERGIES ALTERNATIVES, Paris (FR)

(72) Inventors: Francois Gobin, Orange (FR); Mickael Gennisson, Rochefort du Gard (FR); Christophe Brenneis, Saint Victor la Coste (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 710 days.

(21) Appl. No.: 15/127,303

(22) PCT Filed: Mar. 16, 2015

(86) PCT No.: PCT/EP2015/055396
§ 371 (c)(1),
(2) Date: Sep. 19, 2016

(87) PCT Pub. No.: WO2015/140092
PCT Pub. Date: Sep. 24, 2015

(65) Prior Publication Data
US 2018/0169873 A1   Jun. 21, 2018

(30) Foreign Application Priority Data

Mar. 19, 2014 (FR) .................................... 14 52290

(51) Int. Cl.
*B25J 19/02* (2006.01)
*B25J 1/10* (2006.01)
(Continued)

(52) U.S. Cl.
CPC ............... *B25J 19/023* (2013.01); *B25J 1/08* (2013.01); *B25J 1/10* (2013.01); *B25J 3/02* (2013.01);
(Continued)

(58) Field of Classification Search
CPC ........ B25J 17/0283; B25J 19/023; B25J 1/10; F16M 13/02; B62D 5/007; A61B 34/30
See application file for complete search history.

(56) References Cited

U.S. PATENT DOCUMENTS 4,506,317 A * 3/1985 Duddy ................ F21V 21/0965
                                                         362/191
4,895,329 A * 1/1990 Sloan ...................... F21L 15/08
                                                       248/229.16

(Continued)

FOREIGN PATENT DOCUMENTS

EP       1854590 A1 *   4/2007
FR     2 883 147 A1     9/2006
(Continued)

OTHER PUBLICATIONS

EPO Machine Translation of FR2883147 (A1) of Bisson et al., Sep. 22, 2006. (Year: 2006).*
(Continued)

*Primary Examiner* — Vinh Luong
(74) *Attorney, Agent, or Firm* — Oblon, McClelland, Maier & Neustadt, L.L.P.

(57) ABSTRACT

A camera for observing the inside of a shielded cell comprises a support provided with a spring in the form of a gripper for mounting it on a remote- manipulation arm performing the task to be observed, by means of another arm, exerting solely a force for opening the branches of the spring, after which the camera is properly held, while being able to be removed without difficulty. A stop means is added (Continued)

in order to provide the correct angular position of the camera while preventing its support from turning about the arm, and thus making it possible to position it correctly by other remote-manipulation means.

5 Claims, 9 Drawing Sheets

(51) Int. Cl.
    *B25J 3/02*         (2006.01)
    *B26D 5/00*        (2006.01)
    *B25J 1/08*         (2006.01)
    *H04N 5/225*      (2006.01)
    *F16M 13/02*      (2006.01)
    *G12B 9/08*        (2006.01)

(52) U.S. Cl.
    CPC ........... *B26D 5/007* (2013.01); *H04N 5/2251* (2013.01); *F16M 13/02* (2013.01); *G12B 9/08* (2013.01)

(56) References Cited

U.S. PATENT DOCUMENTS

| | | | |
|---|---|---|---|
| 7,614,909 B2 * | 11/2009 | Lin | F16M 13/00 439/528 |
| D800,207 S * | 10/2017 | Harrison | B25J 3/04 D16/245 |
| 2005/0164541 A1 | 7/2005 | Joy et al. | |
| 2005/0234435 A1 | 10/2005 | Layer | |
| 2008/0056808 A1 | 3/2008 | Bevirt | |
| 2008/0151263 A1 * | 6/2008 | Randers-Pehrson | C40B 30/10 356/601 |
| 2009/0071281 A1 * | 3/2009 | Fisk | B25J 5/005 74/490.03 |
| 2009/0234439 A1 | 9/2009 | Johnson et al. | |
| 2010/0158656 A1 | 6/2010 | Seavey | |
| 2010/0172733 A1 * | 7/2010 | Chalubert | A61F 4/00 414/730 |
| 2014/0000433 A1 * | 1/2014 | Yamamoto | B26D 5/007 83/886 |
| 2014/0055597 A1 | 2/2014 | Kim et al. | |
| 2015/0192242 A1 * | 7/2015 | Zhang | F16M 13/02 248/176.3 |
| 2017/0157776 A1 * | 6/2017 | Gosselin | B25J 3/04 |

FOREIGN PATENT DOCUMENTS

| | | | |
|---|---|---|---|
| JP | 9-127247 | * | 5/1997 |
| JP | 2007-288010 A | | 11/2007 |
| WO | WO 2010103071 A1 | * | 9/2010 |

OTHER PUBLICATIONS

Define a place—Google Search, Jul. 28, 2019. (Year: 2019).*
Define camera—Google Search, Jul. 29, 2019. (Year: 2019).*
Define CCD camera—Google Search, Jul. 29, 2019 (Year: 2019).*
French Search Report dated Aug. 1, 2014 in FR 1452290 Filed Mar. 19, 2014.
International Search Report dated Jun. 16, 2015 in PCT/EP2015/055396 Filed Mar. 16, 2015.
U.S. Appl. No. 14/412,351, filed Dec. 31, 2014, 2005/0136272 A1, Christophe Brenneis, et al.

* cited by examiner

PORTABLE CAMERA DEVICE TO BE ATTACHED TO A REMOTE MANIPULATOR GRIPPER

FIELD OF THE INVENTION

The subject matter of this invention is a portable camera device to be fixed with a remote-manipulator gripper.

BACKGROUND OF THE INVENTION

In remote manipulation activities, the operators observe the scene on which they are working through windows passing through the protection wall alongside the place where the remote manipulators that they are actuating pass through this same wall. Some off-centre places in the cells, or places concealed by an object situated inside, are however inaccessible to this direct vision. The cells have therefore been equipped with vision aids, such as periscopes or cameras. Periscopes often have the drawbacks of being bulky and to offer only limited additional vision to part of the contents of the cell since their location is fixed; this is why cameras are very good complementary tools since they are inexpensive, portable and lightweight items of equipment, and therefore able to be moved to any place, and because they can also be oriented in all directions inside the cells, allowing almost total visual coverage of the volume of the shielded chamber inside which they are situated.

Several techniques using such cameras have been proposed. In one of them, the camera remains at the end of a movable support comprising a foot placed on a surface of the cell, and a flexible rod rising at the middle of the foot, on which the camera is fixed. The foot is placed close to the required scene, and the camera is placed at the correct orientation by deforming the rod. This device is convenient, but has the drawback that the camera must be refocused before each operation, the support being at variable distances from this scene to be observed.

FR 2 883 147 A and US 2008/056808 A describe flexible supports for objects that have great ease of position adjustment, but which can scarcely be envisaged in the field envisaged here, because of their low rigidity and the difficulty in adjusting them with precision other than manually.

The cameras may also be carried by the remote manipulators themselves. Then two remote-manipulator arms are used, the gripper of one of which holds the camera, whereas the gripper of the other carries out the work being observed. This design therefore has the drawback of occupying a second remote-manipulator arm.

Finally, some designs use a camera mounted permanently on a remote-manipulator arm, or an autonomous remote arm, in order to avoid the drawback of the previous design. US 2010/0158656 A and JP 2007-288010 A disclose such devices, where the camera is mounted on the arm by means of a fixed support, or one that is demountably only manually; however, the arm carrying the camera must then be extracted from the cell when the camera has to be replaced, which requires tedious precautions and work in order to be accomplished in accordance with safety rules. And US 2014/055597 A discloses a device where the camera is mounted on such a support by a connection that makes it possible to replace it easily by remote manipulation, which is advantageous and corresponds to one aim of the present invention; however, the support must remain on the arm, so that the drawbacks of the previous devices remain if the support is also to be changed, or adjusted in another way.

SUMMARY OF THE INVENTION

The invention relates to a portable camera device making it possible to avoid the aforementioned drawbacks, in particular the need to refocus with each operation or the occupation of a second remote-manipulator arm, and which can be dismantled freely from the gripper with its entire support and then remounted easily on it if needed, while ensuring the correct position of the camera.

The portable camera device proposed here, to be used in mounting on a remote-manipulator arm, comprises a camera and a support for the camera; the support and the arm comprise complementary connection means, consisting of means for fitting together and brake means. The means for fitting together therefore make it possible to assemble the device on the arm by a simple movement, and therefore without any difficulty, and the brake means make it possible to lock the device at an assembly position, while however making it possible to remove it without difficulty and without significant effort by a movement that is the reverse of the assembly movement.

The means for fitting together and brake means comprise first of all a spring in the form of a gripper, which makes it possible to fix the camera on the remote-manipulator arm, for example with a sealed coupling, in general connecting the wrist joint to the gripper and with a regular circular shape, by a simple gripping operation, pushing the spring against the arm, until its opening is forced. When the spring is installed around the arm, it closes on it by return to its initial shape, and the camera is held firmly. The device can be removed in the same way by exerting an opposite force. It is possible to use a second remote-manipulator arm for this purpose. The second remote-manipulator will however be incapable of placing the support of the camera at a very precise position on the arm despite the ease of connection and disconnection offered by the spring. The means for fitting together and brake means are therefore supplemented either by an abutment of a support face opposite to the camera on a face of the arm, or by a cylindrical machining and a rod housed in said machining, the machining and the rod being distributed over the support and the arm, in order in both cases to provide the support with a given angular position on the circular cross-section of the arm, even if it is badly placed at the start by the second arm.

In a particular embodiment, the support comprises a fixed part on which the spring and the movable part are fixed, connected to the fixed part by an articulation and a brake, on which the camera is fixed. The orientation of the camera with respect to the arm can then be modified as required.

To transmit their images, the cameras are normally provided with a transmission wire. In the invention, the camera can be provided with a moderate length of wire, terminating in a coupling, and a connection with a longer wire, permanently in the cell and provided with a complementary coupling, or a wire situated in the arm of the remote manipulator itself, the complementary coupling then being mounted on the casing of the arm.

Mounting is facilitated if the face opposite to the camera comprises a planar portion situated in front of the spring in an aiming direction of the camera.

The support may comprise a ring for adapting to a support foot in the form of a rod, which makes it possible to store a camera when it is not mounted on the arm, in order to achieve a fixed point of view. When the system is used in an enclosure where it is subjected to strong irradiation, it may also be stored in a metal chest that protects it from the radiation when it is not being used.

In other embodiments, the complementary connection means comprise grooves with complementary cross-sections, distributed on the device and the arm and sliding one in the other. It can be seen that the assembly movement is also a translation movement. The brake means may comprise, in this type of embodiment, a ball pusher and a recess for receiving the ball, distributed on the device and the arm and procuring a stable position once the ball reaches the recess and enters therein.

BRIEF DESCRIPTION OF THE DRAWINGS

The invention will now be described more completely, in relation to the following figures.

DETAILED DESCRIPTION OF THE INVENTION

Figure 1:
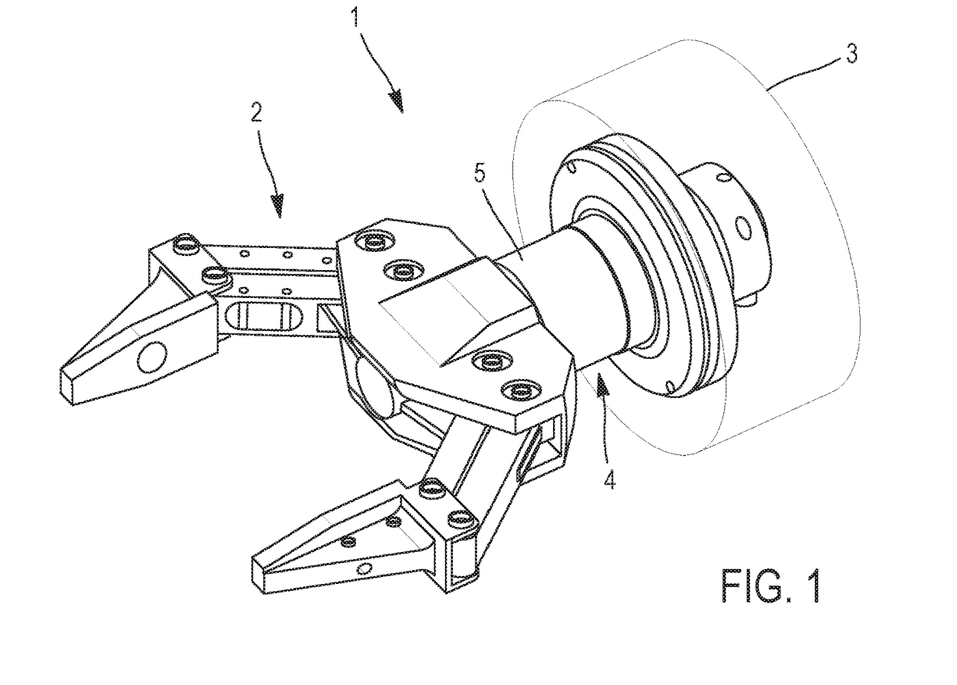
FIG. 1 is a view of a first embodiment of an end of a remote-manipulator arm.
Figure 2:
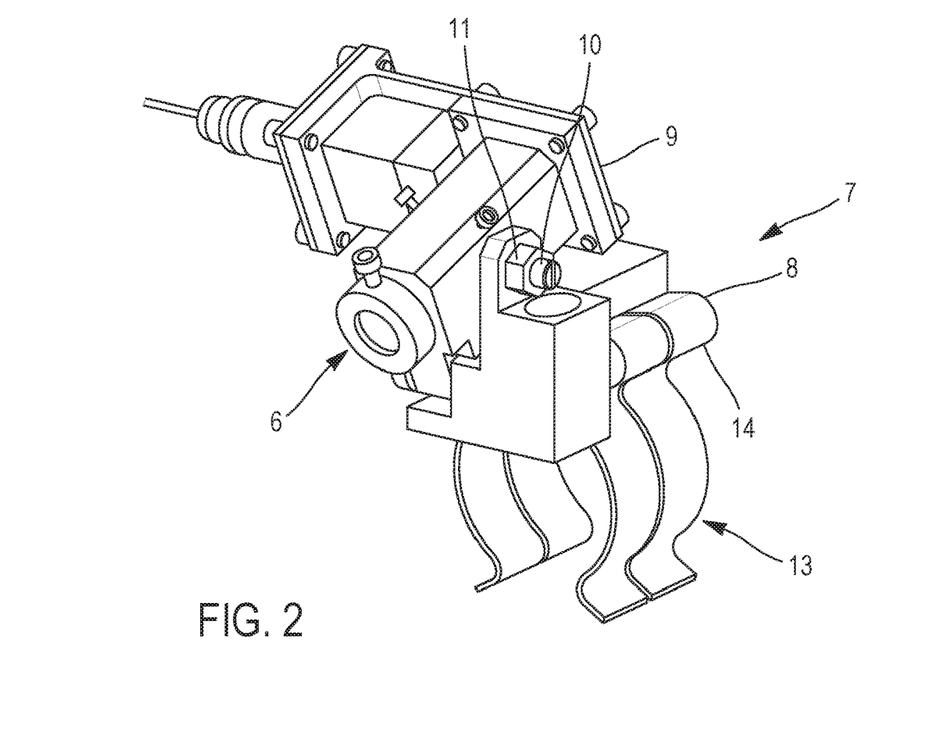
FIG. 2 is a view of the device.
Figure 3:
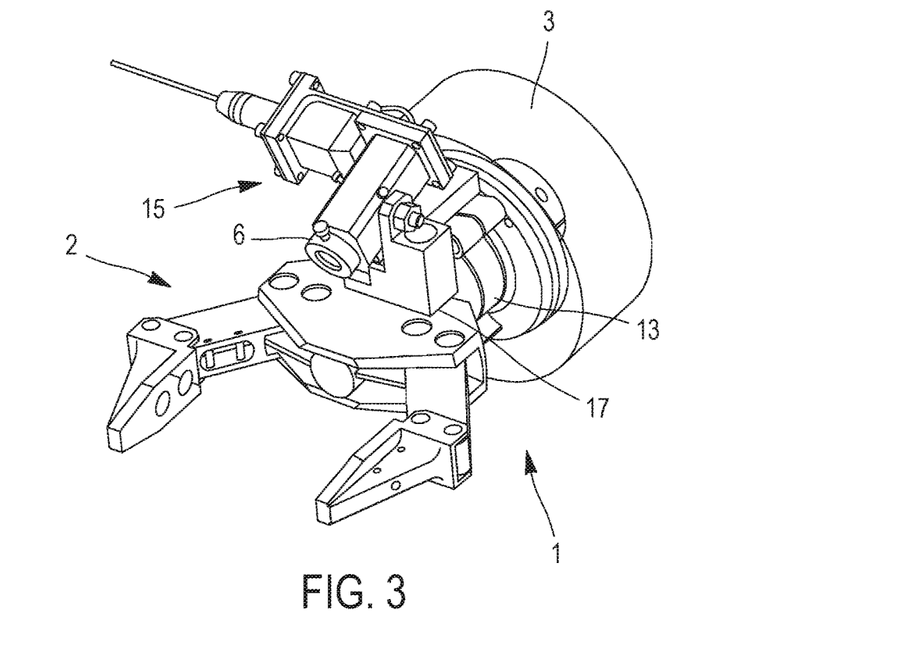
FIG. 3 is a view of the assembly.

The invention is intended for remote-manipulator arms of a widespread type and comprising at the end a tool such as a gripper 2, connected to a distal segment 3 of the arm 1, by a wrist joint 4. The wrist joint 4 is here a coupling designed so as to remain sealed and therefore comprises an external sleeve 5, perfectly cylindrical and smooth (FIG. 1). The device 15 of the invention comprises a camera 6 (FIG. 2) mounted on a support 7, comprising a fixed part 8 and a movable part 9. The camera 6 is secured to the latter. The fixed part 8 and the movable part 9 are connected to each other by an articulation 10 provided with a brake 11, that is to say a mechanism for locking the articulation 10. The fixed part 8 comprises a spring 13, situated under its bottom face 14, opposite to the movable part 9 and camera 6. The device 15 of the invention can be mounted on the arm 1 as shown in FIG. 3, the spring 13 being disposed around the sleeve 5 and the camera 6 being placed just behind the gripper 2 and slightly above it, with an inclination enabling it to observe the work performed by the gripper 2.

Figure 4:
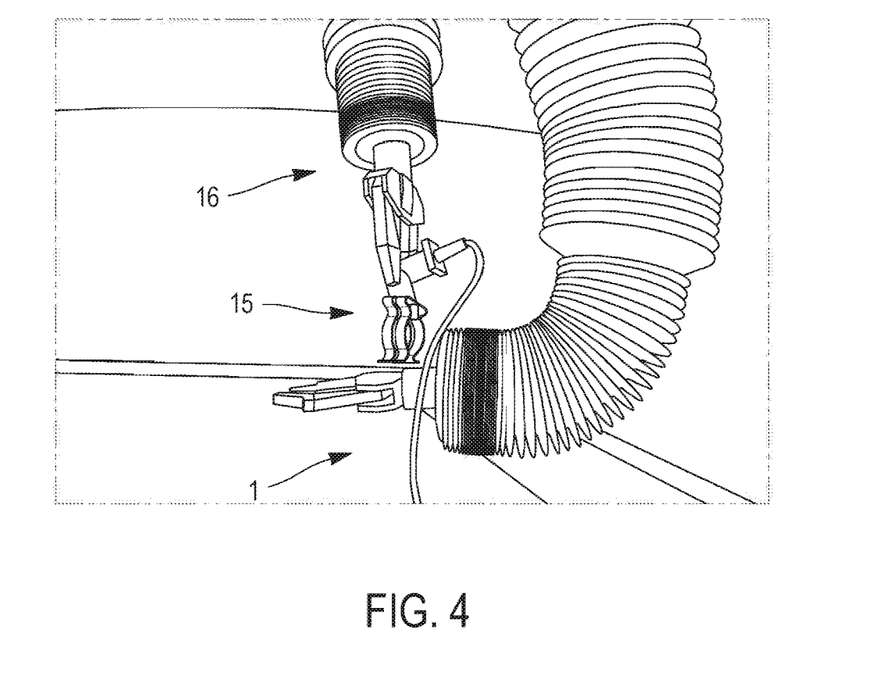
FIG. 4 explains the assembly.

FIG. 4 illustrates the placing of the device 15 on the arm 1, by means of another arm 16, holding the device by the fixed part 8. The spring 13 is directed towards the sleeve 5, and then pushed on it by the arm 16. The branches of the spring 13 are then separated, and the spring 13 is pushed in and fits around the sleeve 5, gripping it. A planar portion 17 of the bottom face 14, situated in the viewing direction of the camera 6, is then pressed on the top face of the gripper 2, providing a reference orientation of the device 15 on the gripper 2. The device can be extracted by an opposite movement.

Figure 5:
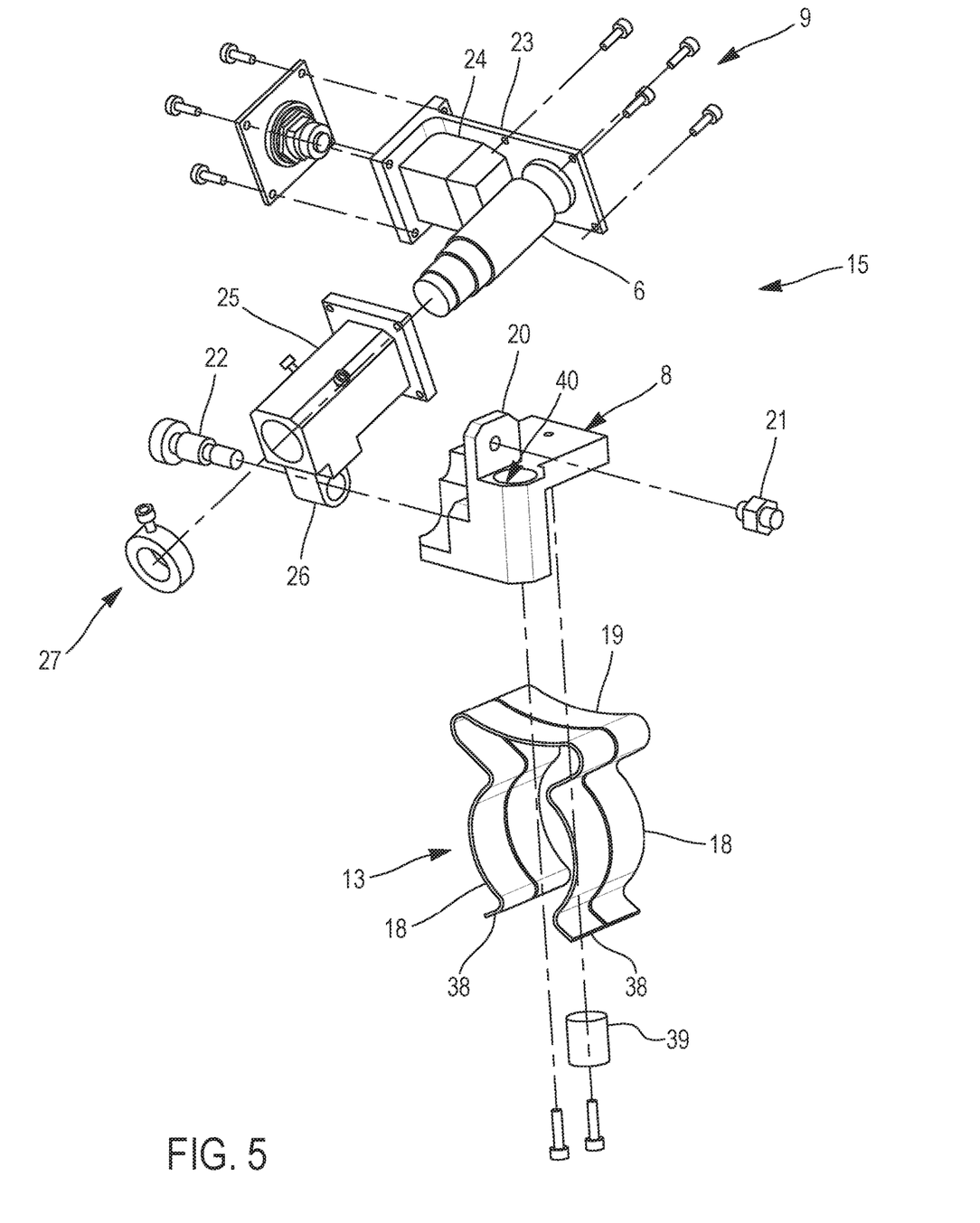
FIG. 5 is an exploded view of the device.
Figure 9:
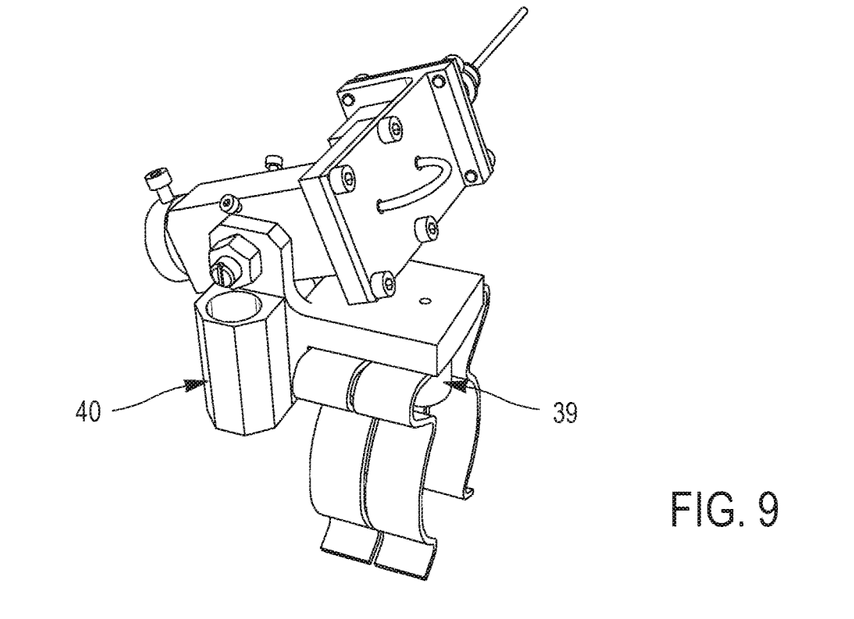
FIG. 9 is another view of the device.

FIG. 5 illustrates the device 15 in detail. The spring 13 comprises two curved branches 18, their concavities being oriented one towards the other, and joined between them by a junction 19, screwed to the fixed part 8. However, the free ends of the branches 18 have divergent portions 38 inclined forming an angle, so as to open the branches 18 when the spring 13 is pressed on the coupling 5 which is shown in FIG. 1. The fixed part 8 also comprises a flange 20 through which a ball screw 21 passes, and a housing for a spindle 22. The ball screw 21 and the spindle 22 constitute the main parts of the brake 11 and of the articulation 10. The fixed part 8 also comprises (FIG. 9) a strut 39 situated between the branches 18 of the spring 13 and making it possible to maintain the spring 13 under tension when the system is mounted on the wrist joint 4, forcing an abutment of the ends of the branches 13 on the wrist joint 4, and an opening of them with respect to their idle state. The fixed part 8 may be provided with a cylindrical machining 40 for housing a rod, not shown, in order to leave the device therein when it is at rest.

The movable part 9 comprises a movable frame 25, carrying the camera 6 and a rear plate 23 holding the camera 6. The latter carries a connector plate on which the optical and electrical connector 24 is mounted. The movable frame 25 is provided with a bottom clevis 26 in which the spindle 22 of the articulation 10 is engaged. When assembly is effected, the movable frame 25 therefore turns with respect to the fixed part 8, driving the camera 6 and the rest of the movable part 9, but its movement can be stopped by screwing of the screw 21, the ball of which comes to bear in recesses produced on the side of the movable frame 25. A focusing knob 27 projects beyond the movable frame 25 at the front, and makes it possible to adjust the focusing of the camera 6.

Figure 6:
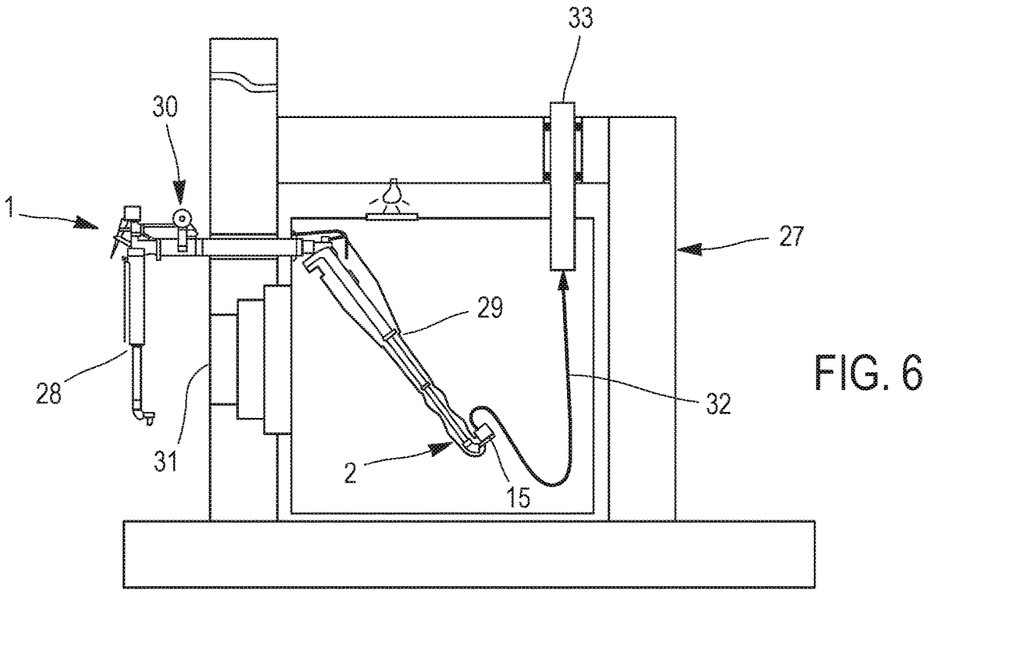
FIGS. 6, 7 and 8 illustrate the electrical connection of the camera.

A transmission between the camera 6 and the outside of the place of work of the camera 6 can be provided mainly in two ways. In the embodiment in FIG. 6, the arm 1 and the shielded cell 27 in which it works are shown completely, the arm 1 conventionally comprising a master arm 28 outside the cell 27, a slave arm 29 inside, which replicates the movements of the master arm 28, and a cross-member 30 of the cell 27, above an observation window 31. The device 15 can be connected to the outside by a wire 32, connecting the connector 24 to an electrical conduit 33 of a known type, passing sealingly through the wall at the cell 27. The wire 32 may be continuous through the conduit 33, or joined to it by a coupling, not shown.

Figure 7:
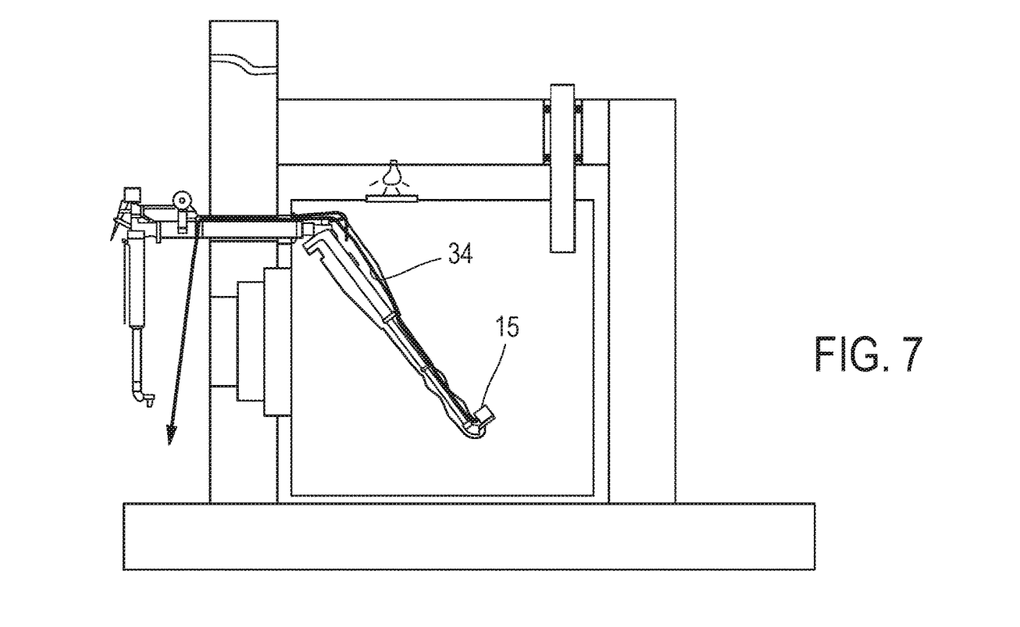
Figure 8:
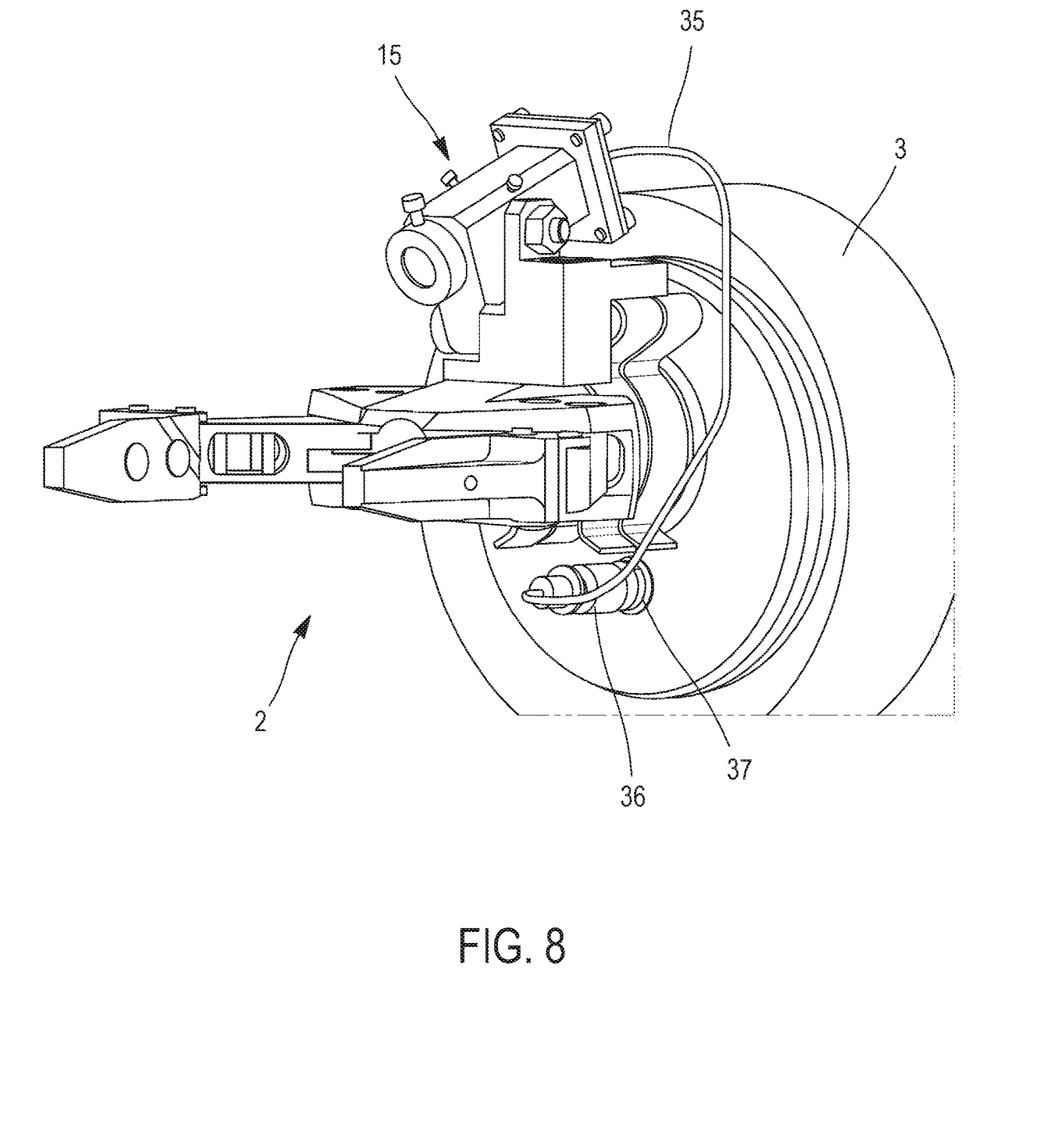

In the design in FIG. 7, the wire, then 34, extends along the arm 1, in its segments. Provision is then made to provide the device 15 with a first length of wire 35 (Figure J, finishing on a connector 36 that a second length of wire secured to the second arm 16 can plug into using a complementary connector 37 established on the distal segment 3, once the device 15 has been fitted.

The invention can also be installed on new remote manipulators, which will either replace those that are in production (when they are broken) or equip new cells. Still using the principle of braked fitting together, the invention will then be able to be fixed to the rotary coupling by means of shapes produced directly on the wrist joint of the gripper (sealed coupling).

Figure 10:
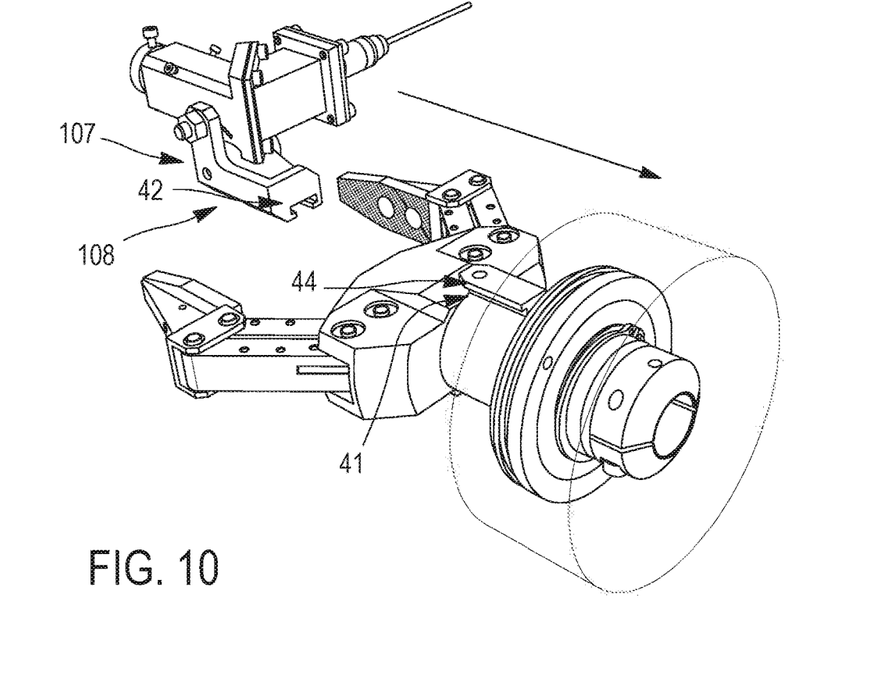
FIGS. 10, 11 and 12 illustrate a second embodiment of the device and the mounting thereof.
Figure 11:
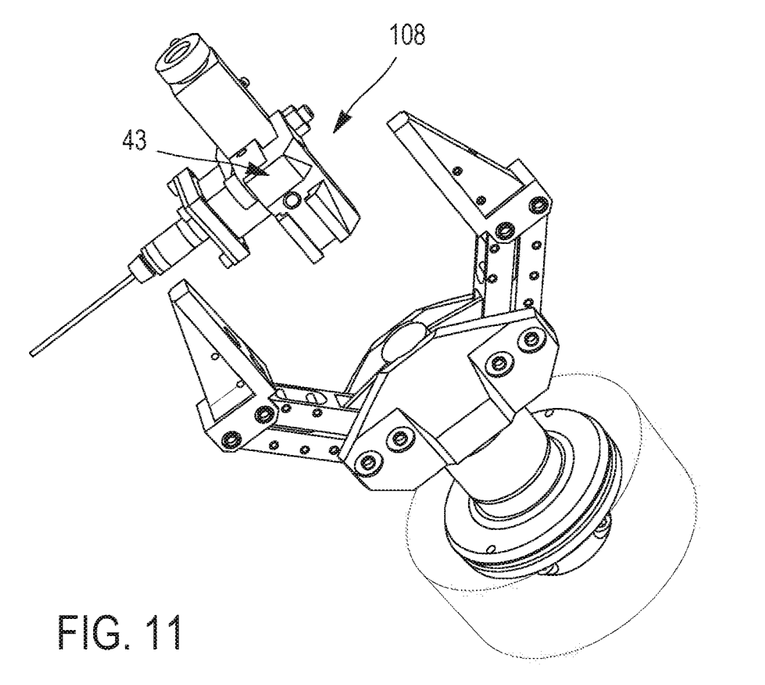
Figure 12:
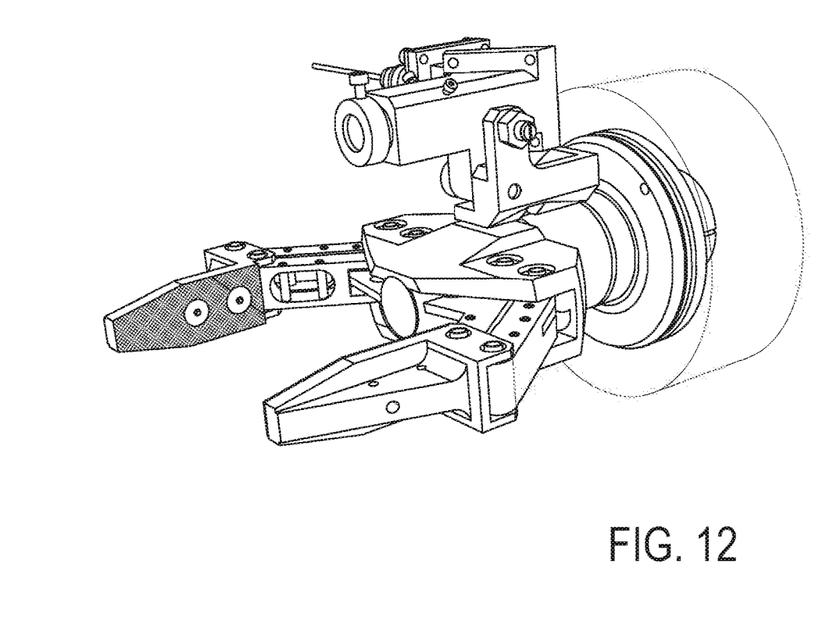

Other embodiments will now be described briefly, in order to explain the concept of braked fitting together between the device and the remote-manipulator arm 1, on which it is mounted. In the embodiment in FIGS. 10 to 12, the support bears the reference 107 and, as before, comprises a fixed part and a movable part. The movable part is similar to the one in the previous embodiment, but the fixed part, now 108, is distinguished from the previous one as follows. The spring 13 is omitted, and replaced by a groove 42 in the form of a female T, that is to say it is wider at the bottom, on the two sides, than at the opening. It also comprises a ball pusher 43, at the end of the groove 42. The arm 1 comprises, either on the gripper 2 or on the sealed coupling 5, a male groove 41, with a complementary shape in a T, and a notch 44 at the end of the groove. The assembly takes place by translation, sliding the grooves 41 and 42 one in the other, until the ball of the pusher 43 enters the notch; the device is then held in place, being able to be withdrawn, without significant force, when required.

Figure 13:
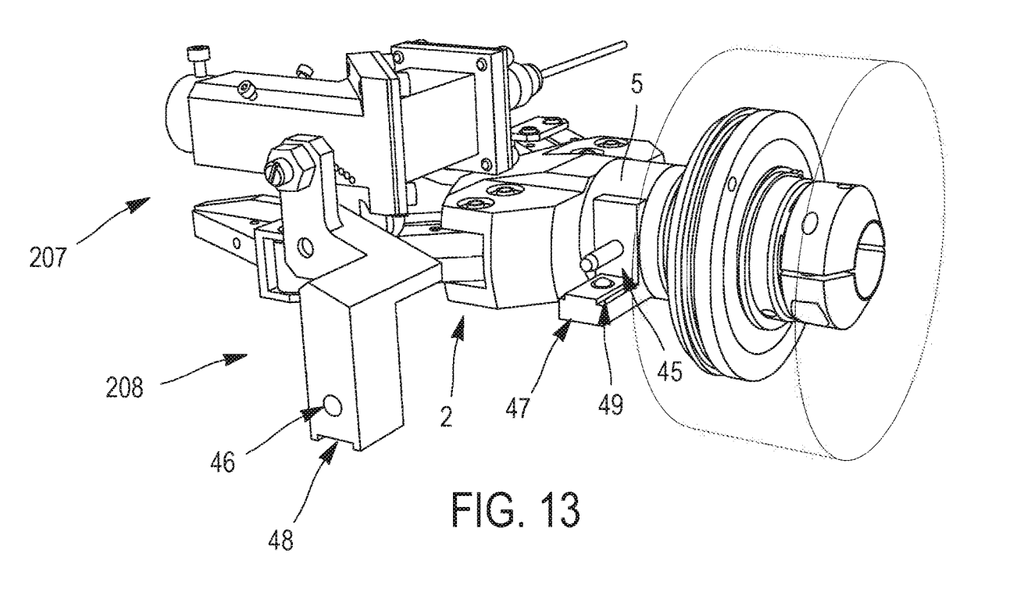
FIGS. 13, 14 and 15 illustrate a third embodiment of the device and the mounting thereof.
Figure 14:
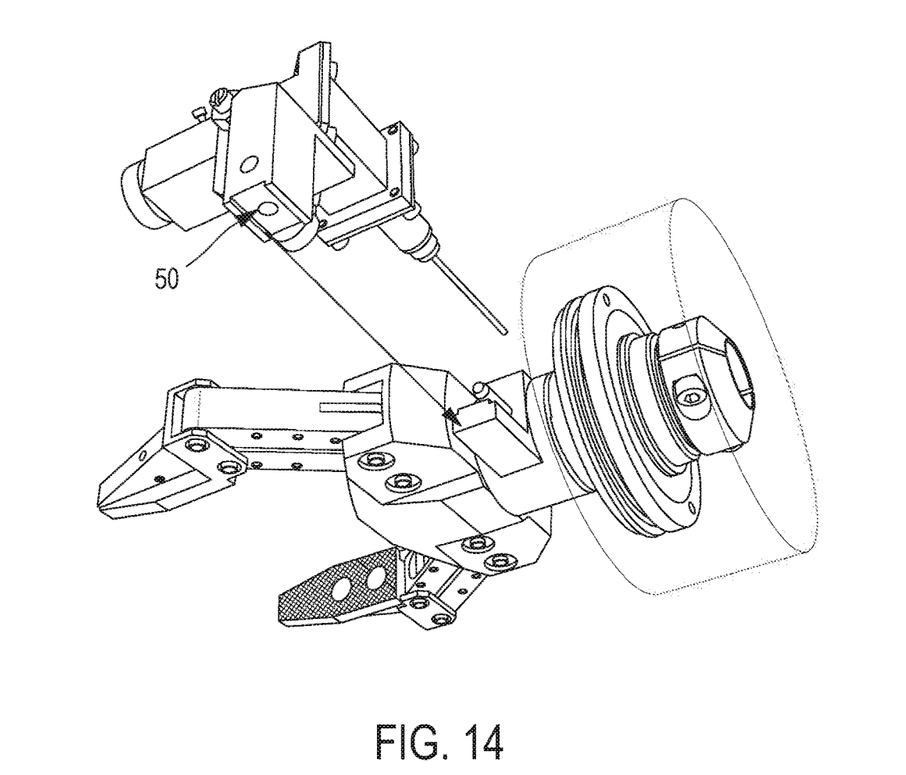
Figure 15:
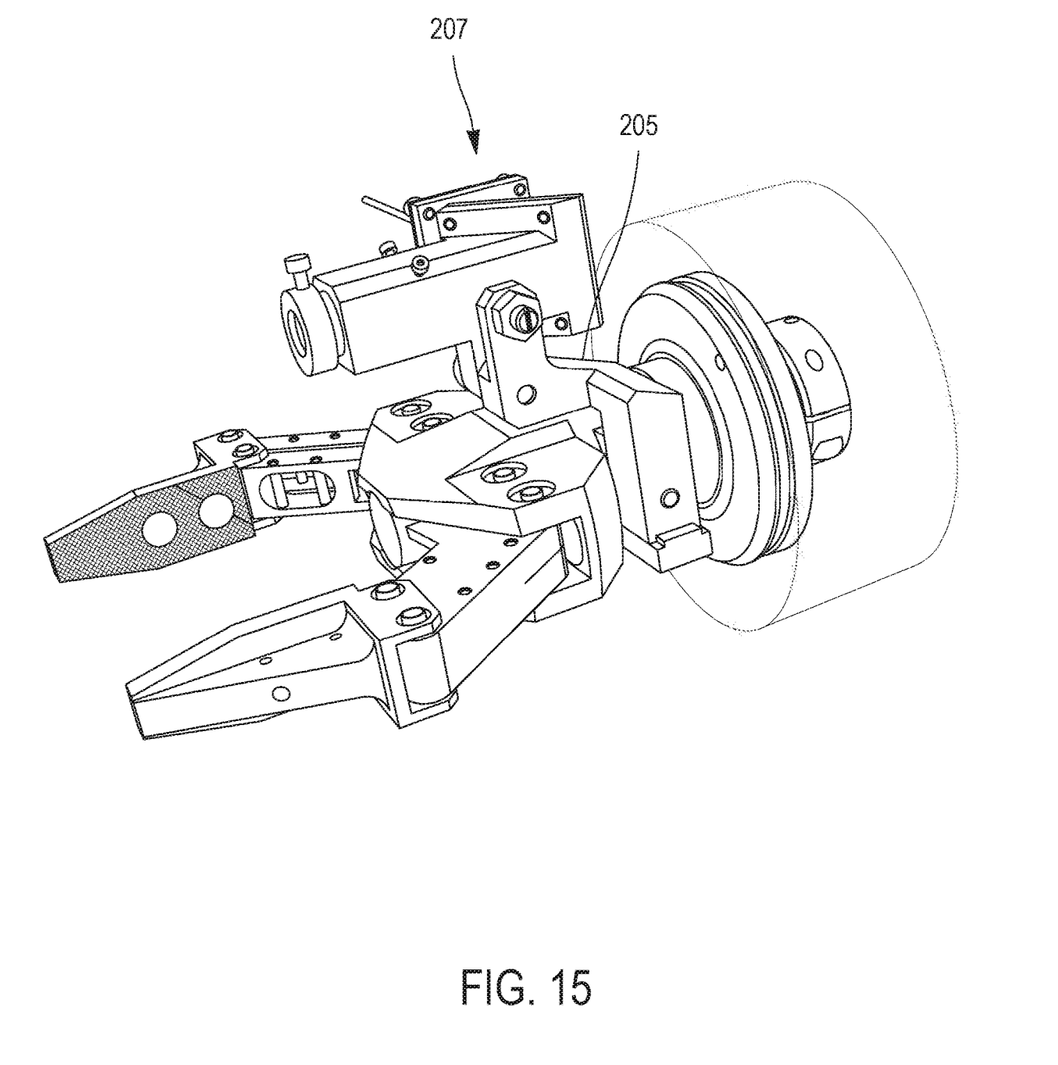

A third embodiment will be described in relation to FIGS. 13, 14 and 15. The device 207 differs here again through its fixed part 208. It comprises a cylindrical orifice 46, which is inserted in a cylindrical rod 45, erected on the sealed coupling 5, or failing this the gripper 2. The rotational stoppage of this connection is provided by a lug 47 on the sealed coupling 5 and by a groove 48 on the fixed part 208. The lug 47 is disposed alongside the rod 45 and extends parallel to it, whereas the groove 48 extends the orifice 46. The lug 47 slides in the groove 48, as soon as the rod 45 slides in the orifice 46. The braking is here also provided by the ball pusher 49, established here on the lug 47, and the ball of which is housed in a notch 50, at the bottom of the groove 48, when the pushing in is sufficient. The properties of this device are similar to those of the previous embodiment.

The device could also comprise sensors other than the camera, and in particular a lighting means, with light emitting diodes for example, directed in the same direction as the camera, in order to illuminate the scene for it; or, among other possibilities, a radioactivity sensor, measuring the surrounding activity. Such sensors could be mounted adjacent to the camera, on a free portion of the rear plate 23.

The camera could be any known model with regard to the particles detected (photons or ionising particles, such as a particles), the detection mode (ordinary optical cameras or charge-transfer cameras could thus be used for detecting photons), or the type of image captured (two-dimensional or three-dimensional); a plurality of cameras could thus be used simultaneously to take three-dimensional images, or particular, more extensive, scenes for example.

The invention claimed is:

1. A portable camera device to be mounted on a remote-manipulator arm, comprising:
    a camera and a support for the camera, the support comprising complementary means for fitting together the support and the arm, the support further comprising a brake,
    wherein the complementary means for fitting together the support and the arm comprises a fixing spring in a form of a gripper and, distributed on the support and the arm, an abutment of a face of the support opposite to the camera on a face of the arm providing a reference orientation of the device, wherein the spring comprises two curved branches, comprising concavities directed towards each other, free ends diverging, and a strut disposed between the branches.

2. The portable camera device according to claim 1, further comprising a wire for connecting the camera to an external device, and the wire comprises a first length secured to the portable camera device, a second length secured to the remote-manipulator arm, and a coupling between the first length and the second length of the wire.

3. The portable camera device according to claim 1, wherein the support comprises a fixed part including the complementary means for fitting together the support and the arm, and another part, connected to the fixed part by an articulation and the brake, to which the camera is fixed.

4. The portable camera device according to claim 3, wherein the brake comprises a ball screw.

5. The portable camera device according to claim 1, wherein the camera is selected from a group consisting of an optical camera, a charge-transfer camera, and an ionizing particle detection camera, and
    wherein the camera producing two-dimensional or three-dimensional images.

* * * * *